United States Patent
Chen

(10) Patent No.: US 10,090,784 B2
(45) Date of Patent: Oct. 2, 2018

(54) ELECTRIC HAND TOOL AND ELECTROMAGNETIC BRAKE CONTROL METHOD THEREOF

(71) Applicant: X'POLE PRECISION TOOLS INC., Taoyuan (TW)

(72) Inventor: Bach Pangho Chen, Claremont, CA (US)

(73) Assignee: X'POLE PRECISION TOOLS INC., Zhongli Dist., Taoyuan (TW)

( * ) Notice: Subject to any disclaimer, the term of this patent is extended or adjusted under 35 U.S.C. 154(b) by 0 days.

(21) Appl. No.: 15/410,054

(22) Filed: Jan. 19, 2017

(65) Prior Publication Data
US 2018/0205329 A1    Jul. 19, 2018

(51) Int. Cl.
*H02P 3/00* (2006.01)
*H02P 3/06* (2006.01)
*H02K 7/14* (2006.01)

(52) U.S. Cl.
CPC .............. *H02P 3/06* (2013.01); *H02K 7/145* (2013.01)

(58) Field of Classification Search
CPC ...... H02P 3/12; H02P 6/24; H02P 3/22; B60L 2200/26; B60L 7/22
USPC ........................................................ 318/375
See application file for complete search history.

(56) References Cited

U.S. PATENT DOCUMENTS

| | | | |
|---|---|---|---|
| 2002/0047402 A1* | 4/2002 | Taniguchi | F16C 32/0444 310/90.5 |
| 2012/0074881 A1* | 3/2012 | Pant | B25B 23/147 318/400.09 |
| 2012/0279743 A1* | 11/2012 | Suda | B25F 5/001 173/176 |
| 2014/0034434 A1* | 2/2014 | Esenwein | B23Q 11/0092 188/267 |

FOREIGN PATENT DOCUMENTS

TW    M349819    2/2009

* cited by examiner

*Primary Examiner* — Kawing Chan
*Assistant Examiner* — Bradley Brown
(74) *Attorney, Agent, or Firm* — Muncy, Geissler, Olds & Lowe, P.C.

(57) ABSTRACT

An electric hand tool is provided. The electric hand tool receives a shutdown signal issued by a shutdown element under control during an operation process of the electric hand tool, so as to request a driving module to stop providing a driving signal to a plurality of coils provided at the electric motor, and to conduct a brake loop connected to the coils and the driving module. Thus, a short circuit is formed between the coils and the driving module to cause the electric motor to temporarily enter a power generating state to generate a sensing current. The coils receive the sensing current to establish a first magnetic field. The first magnetic field interferes with a second magnetic field produced by a plurality of permanent magnets to form an interfering repulsive force that stops the rotor from rotating, thereby achieving an object of braking promptly.

7 Claims, 4 Drawing Sheets

ELECTRIC HAND TOOL AND ELECTROMAGNETIC BRAKE CONTROL METHOD THEREOF

FIELD OF THE INVENTION

The present invention relates to an electric hand tool and an electromagnetic brake control method thereof.

BACKGROUND OF THE INVENTION

An electric hand tool drives an application tool to operate using rotational energy generated from an electric motor it includes. Taking a grinding machine tool for example, the electric motor drives a grinding disc to rotate when activated to further perform a grinding operation. However, when the electric motor rotates for a certain period of time and is controlled to stop operating, even if the electric motor does not continue receiving the driving signal, a rotor of the electric motor and the grinding disc cannot immediately stop rotating due to the inertia stored during the rotation of the grinding disc, and continue to rotate for a short period of time.

A technical solution is provided in view of the above issue. For example, the Taiwan Patent No. M349819 discloses a decelerating device for a grinding disc of a grinding machine, and more particularly a grinding disc structure for decelerating a rotational speed of a grinding machine. The above grinding disc structure includes a grinding disc, a decelerating device and a body. The grinding disc includes a fixing portion for fixing purposes. An outer edge of the fixing portion forms a contact plane, and a grinding plane for performing a grinding process is formed at the other surface opposite the contact plane. The decelerating device is abutted against the contact plane of the grinding disc, and is provided with a damping body for decelerating the speed of the grinding disc. The damping body may be accommodated in an inner chamber provided in a recessed manner at a periphery of a base. An axial opening is provided at a center position of the base. A sliding groove for accommodating a driving body is provided at an outer peripheral surface of the axial opening. An embedded limiting opening is provided at a center of the driving body, which is covered by a cover plate incorporable with the base. A through hole facing the axial opening is provided a center position of the cover plate, and a sliding channel for accommodating the driving body is provided in a recessed manner at an outer periphery of the through hole. The grinding machine allows the grinding disc and the decelerating device to be assembled and combined. The body includes an internal accommodating space, above which the decelerating device provides a shield using the base. The accommodating space is internally provided with a driving shaft, which allows the fixing portion and the axial opening to be assembled and fixed to perform driving operations.

However, due to constant contact between the damping body and the contact plane in the above structure, the rotational speed of the grinding disc is reduced during the rotation process, such that the fineness and quality of grinding are degraded. Further, such technology also adds a burden to the electric motor and is unbeneficial for applications of the electric motor. Moreover, wear is caused by abrasion between the damping body and the contact plane over an extended period of time, and replacement of these components is needed on a regular time basis. Further, certain amount of powder is produced at a surface of an object being grinded due to the abrasion of the damping body and the contact plane to result in pollution.

SUMMARY OF THE INVENTION

It is an object of the present invention to solve the effect of the grinding quality and issues caused by the machine tool of a conventional structure.

To achieve the above object, the present invention provides an electromagnetic brake control method for an electric hand tool. The electromagnetic brake control method includes following steps.

In step 1, when an electric motor is in an electrically powered state, a shutdown signal issued by a shutdown element under control is received.

In step 2, a driving module is request to stop providing a driving signal to a plurality of coils provided on a stator or a rotor provided at the electric motor.

In step 3, a brake loop connected between the coils and the driving module is conducted to cause a short circuit between the coils and the driving module.

In step 4, using residual rotational energy of the rotor of the electric motor when the electrically powered state ends, the rotor is caused to continue rotating relative to the stator, such that the electric motor is caused to temporarily enter a power generating state to generate a sensing current. The coils receive the sensing current to establish a first magnetic field. The first magnetic field interferes with a second magnetic field produced by a plurality of permanent magnets provided at the electric motor to form an interfering repulsive force that stops the rotor from rotating.

In one embodiment, in step 3, the short circuit is caused to occur in turn between the coils and the driving module.

In one embodiment, in step 3, the short circuit is caused to occur simultaneously between the coils and the driving module.

In one embodiment, step 3 includes a sub-step of calculating a short circuit activation time to control the short circuit between the coils and the driving module.

In addition, the present invention further provides an electric hand tool. The electric hand tool includes a driving module, a shutdown element and an electric motor. The electric motor includes a rotor and a stator. One of the rotor and the stator is provided with a plurality of permanent magnetic, and the other is provided with a plurality of coils. The electric hand tool further includes a brake loop connected to the coils and the driving module. When triggered, the brake loop causes at least one of the coils to form a short circuit with the driving module to cause the electric motor to temporarily enter a power generating state, so as to perform braking using an interfering impulsive force formed in the power generating state.

With the above implementation of the present invention, as opposed to the prior art, the present invention implements braking through an electromagnetic means to eliminate a damping body and simplify the overall structure of the electric hand tool.

DETAILED DESCRIPTION OF THE PREFERRED EMBODIMENTS

Details and technical contents of the present invention are given with the accompanying drawings below.

Figure 1:
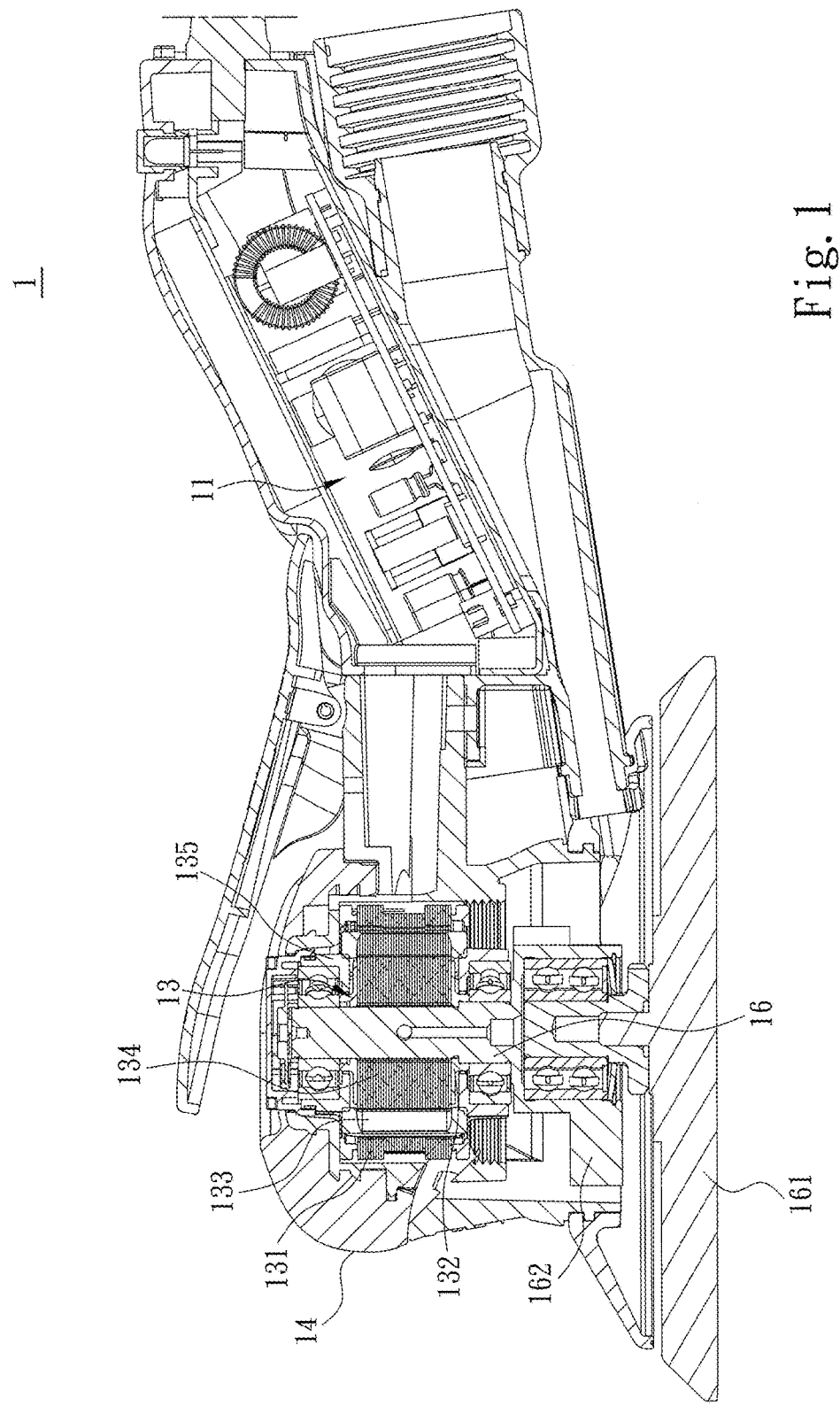
FIG. 1 is a sectional schematic diagram of an electric hand tool of the present invention.
Figure 2:
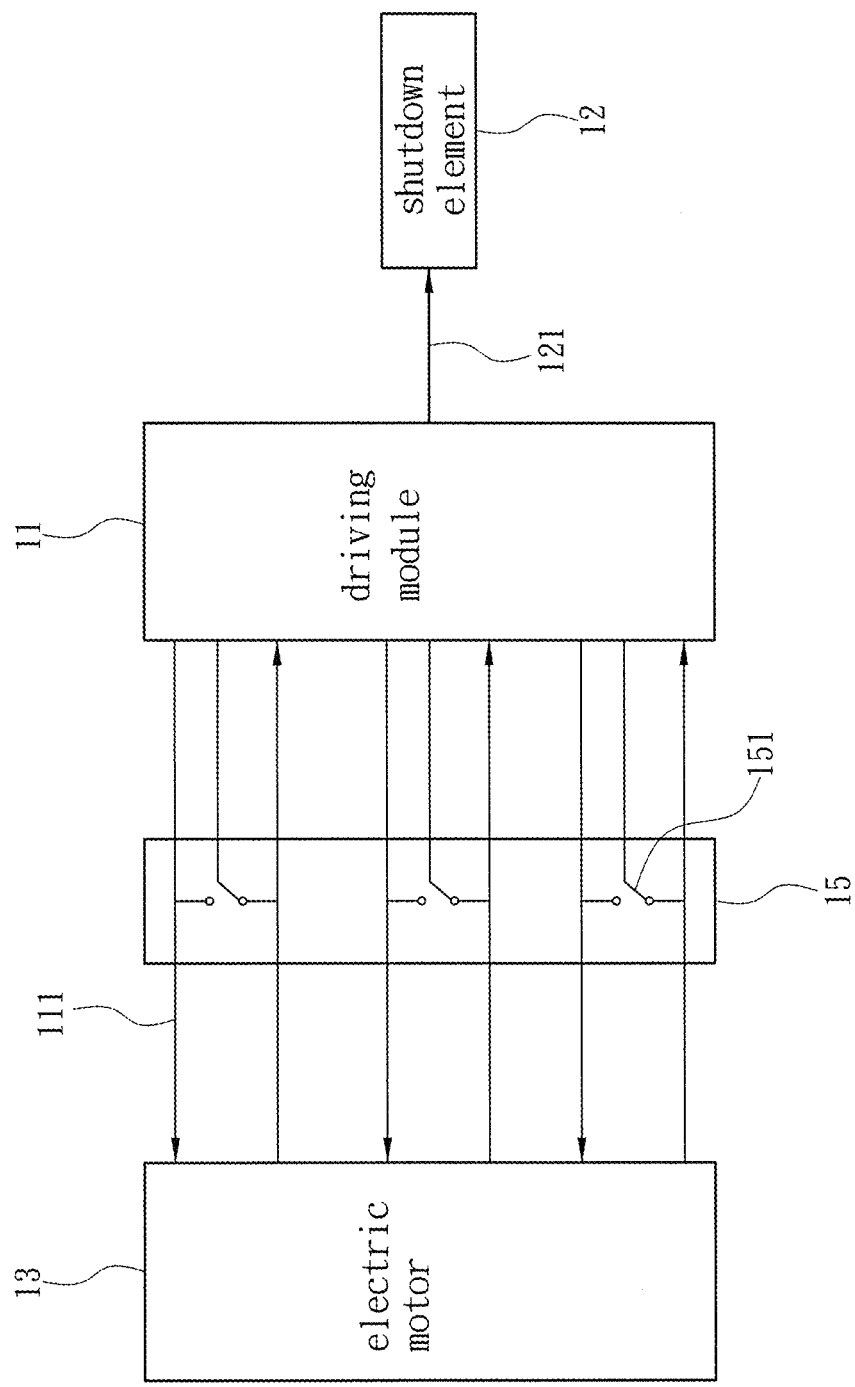
FIG. 2 is a schematic diagram of a driving relationship of the present invention.

Referring to FIG. 1 and FIG. 2, the present invention provides an electric hand tool and an electromagnetic brake control method thereof. An electric hand tool 1 may be an electric grinder or an electric cutter. The type of the electric hand tool is not limited in the present invention. The electric hand tool 1 includes a driving module 11, a shutdown element 12 and an electric motor 13. The driving module 11, the shutdown element 12 and the electric motor 13 are disposed on a hand tool housing 14. The driving module 11 handles activation and rotational speed adjustment of the electric motor 13. During an operation process performed by the electric hand tool 1, the driving module 11 provides the electric motor 13 with a driving signal 111, so as to cause the electric motor 13 to enter an electrically powered state after the electric motor 13 receives the driving signal 111. Further, the driving signal 111 may be a tri-phase sinusoidal signal. The shutdown element 12 is connected to the driving module 11, and is revealed at a surface of the hand tool housing 14. Thus, based on a brake requirement during the operation process, an operator may trigger the shutdown element 12 to cause the shutdown element 12 to issue a shutdown signal 121 to the driving module 11. The electric motor 13 includes a rotor 131 and a stator 132. One of the rotor 131 and the stator 132 is provided with a plurality of permanent magnets 133, and the other is provided with a plurality of coils 134. An example where the rotor 131 is provided with the permanent magnets 133 and the stator 132 is provided with the coils 134 is given herein. However, the present invention is not limited to such example. Further, operation principles of the electric motor 13 are generally known to one person skilled in the art, and shall be omitted. Further, the electric motor 13 may be implemented by, for example but not limited to, an internal rotor or an external rotor.

Referring to FIG. 2, the electric hand tool 1 of the present invention further includes a brake loop 15 connected between the coils 134 and the driving module 11. Whether the brake loop 15 is conducted is controlled by the driving module 11. When the driving module 11 does not receive the shutdown signal 121, the brake loop 15 is not conducted; when the driving module 11 receives the shutdown signal 121, the brake loop 15 is conducted. In one embodiment, at least one switch 151 may be included between the loop between the driving module 11 and the coils 134 and the brake loop 15. The switch 151 is controlled by the driving module 11 to conduct the brake loop 15.

Figure 3:
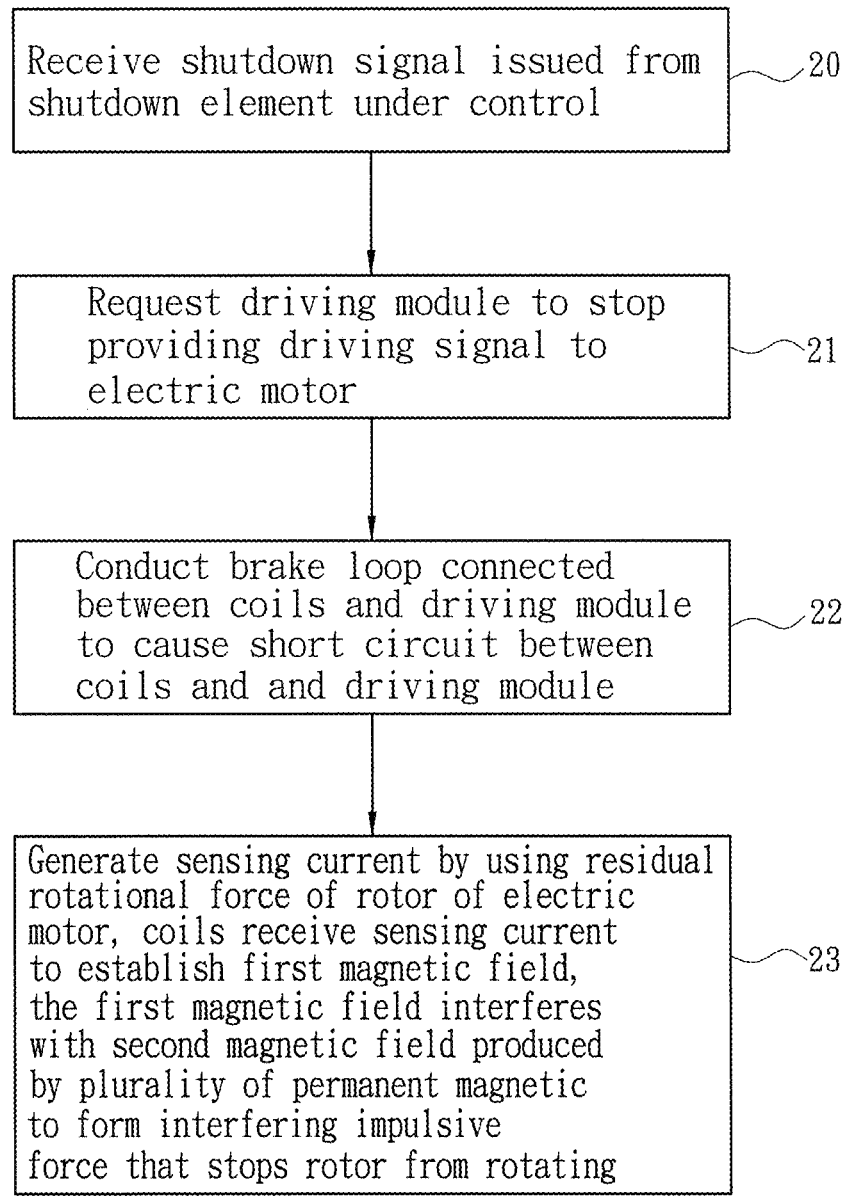
FIG. 3 is a flowchart according to an embodiment of the present invention.

Referring to FIG. 3, the electromagnetic brake control method of an electric hand tool of the present invention includes following steps. In step 1 (20), when the electric motor 13 is in an electrically powered state, the shutdown signal 121 issued by the shutdown element 12 under control is received. In step 2 (21), the driving module 11 is request to stop providing the driving signal 111 to the plurality of coils 134 provided on the stator 132 or the rotor 131. In step 3 (22), the brake loop 15 connected between the coils 134 and the driving module 11 is conducted to cause a short circuit between the coils 134 and the driving module 11. In step 4 (23), using residual rotational energy of the rotor 131 included in the electric motor 13 when the electrically power state ends, the rotor 131 is caused to continue rotating relative to the stator 132 to cause the electric motor 13 to temporarily enter a power generating state to generate a sensing current. The coils 134 receive the sensing current to establish a first magnetic field. The first magnetic field interferes with a second magnetic field produced by the plurality of permanent magnets 133 provided at the electric motor 13 to form an interfering repulsive force that stops the rotor 131 from rotating.

Figure 4:
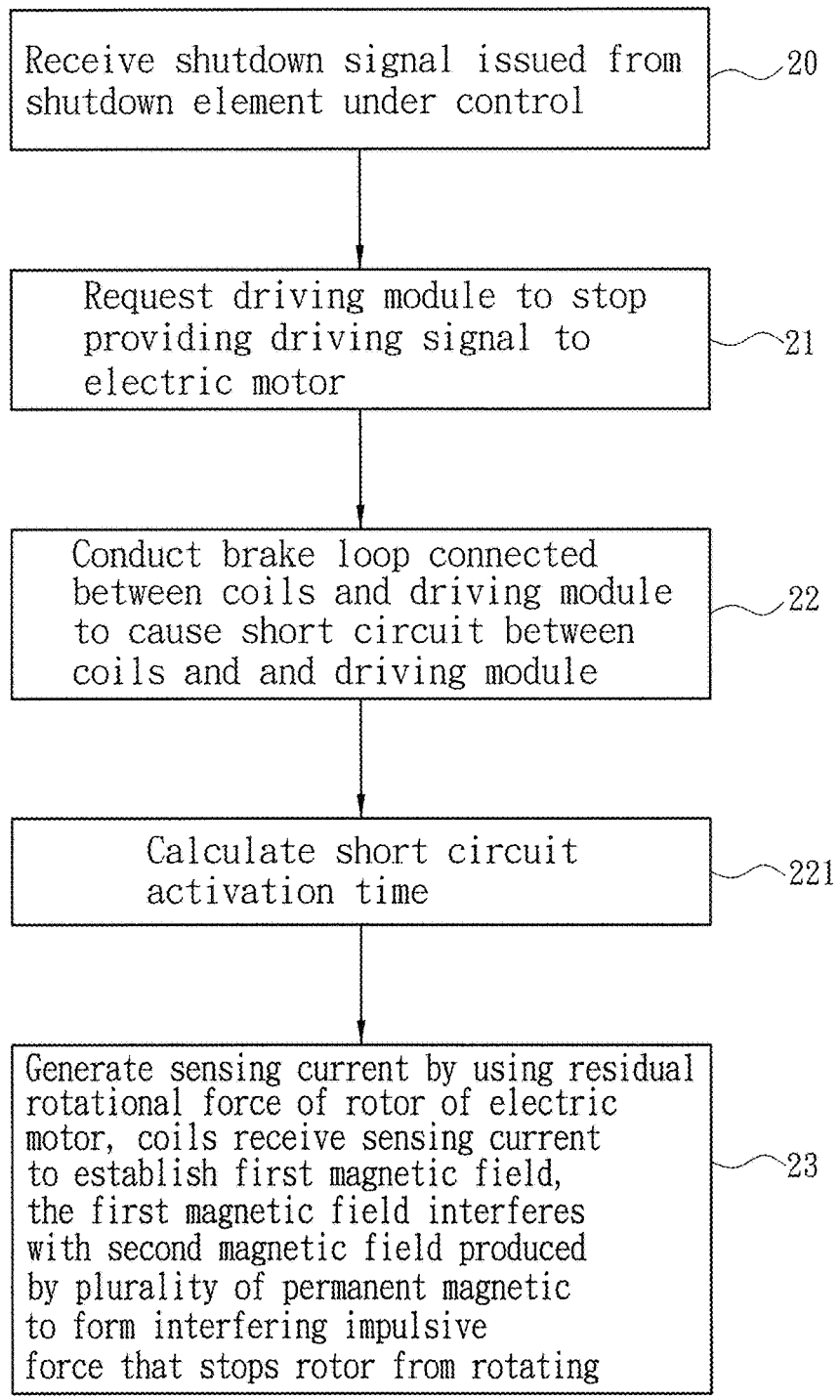
FIG. 4 is a flowchart according to another embodiment of the present invention.

More specifically, when the method of the present invention is initially performed, the electric hand tool 1 needs to be in an activated state; that is, the electric motor 13 is in the electrically powered state. At this point, the operator triggers the shutdown element 12 to cause the shutdown element 12 to issue the shutdown signal 121 to the driving module 11, i.e., sending a brake instruction to the driving module 11. The driving module 11 immediately stops providing the driving signal 111 to the coils 134 once the shutdown signal 121 is received. Next, the driving module 11 controls the switch 151 to cause the short circuit between the coils 134 and the driving module 11. That is to say, the coils 134 are conducted because the brake loop 15 is connected. In one embodiment, during the implementation of step 3 (22), the brake loop 15 may be further be set to cause the short circuit to occur simultaneously between the coils 134 and the driving module 11. In another embodiment, the brake loop 15 may further be set to cause the short circuit to occur in turn between the coils 134 and the driving module 11. Referring to FIG. 4, in one embodiment, step 3 (22) includes a sub-step 221 of calculating a short circuit activation time to control the short circuit between the coils 134 and the driving module 11. Further, the timing process of the short circuit activation time may be implemented by a built-in timer with a timing function in the driving module 11, and the length of the short circuit activation time may be correspondingly adjusted based on application requirements.

In continuation, the electric motor 13 cannot obtain the driving signal 111, such that the rotor 131 of the electric motor 13 continues rotating relative to the stator 132 using residual rotational energy when the electrically powered state ends. Again referring to FIG. 1, for example, assume that the electric hand tool 1 is a grinding machine tool. In the embodiment, the electric motor 13 is an external rotor structure, and the rotor 131 is assembled to a tool axis 16 through a bridging element 135. In addition to assembling to a grinding disc 161, one end of the tool axis 16 is further connected to an eccentric block 162. When the electric hand tool 1 is activated, the tool axis 16 rotates with the rotor 131, and the eccentric block 162 also rotates with the hand tool housing 14 to generate a centrifugal force. Thus, when the electric motor 13 stops rotating as the electric hand tool 1 is to stop operating, although the rotor 131 cannot interact with the stator 132 to generate momentum, the rotor 131 and the eccentric block 162 at this point continue to rotate for a short period of time using the residual rotational force (i.e., the centrifugal force). In the above situation, with the rotation performed by the rotor 131 during the short period of time, a second magnetic field that the coils 134 establish on the permanent magnets 133 performs magnetic line cutting, such that the electric motor 13 temporarily enters a power generating state to generate a sensing current. However, due to the short circuit of the coils 134, a first magnetic field is established after the coils 134 receive the sensing current. The first magnetic field and the second magnetic field, being not artificially planned or designed, produce mutual interference and hence an interfering repulsive force to stop the rotor 131 from rotating, thereby achieving the object of electromagnetic braking.

What is claimed is:

1. An electromagnetic brake control method of an electric hand tool, comprising steps of:
    step 1: receiving a shutdown signal issued by a shutdown element under control when an electric motor is in an electrically powered state;
    step 2: requesting a driving module to stop providing a driving signal to a plurality of coils provided on a stator or a rotor of the electric motor, and providing a state changing signal to at least one switch arranged between the driving module and the coils;
    step 3: controlling the at least one switch and conducting a brake loop connected to the coils and the driving module to cause a short circuit to form between the coils and the driving module; and
    step 4: ending the electrically powered state of the electric motor through the at least one switch and rotating the rotor relative to the stator continually by residual rotational energy of the rotor of the electric motor when the electrically powered state ends, and then making the electric motor temporarily enter a power generating state to form a sensing current interacting with the plurality of coils to produce a first magnetic field, and generating an interfering impulsive force by interfering the first magnetic field with a second magnetic field, which is produced by a plurality of permanent magnets provided on the electric motor to stops the rotor from rotating.

2. The electromagnetic brake control method of an electric hand tool of claim 1, wherein step 3 comprises a sub-step of calculating a short circuit activation time to control the short circuit between the coils and the driving module.

3. The electromagnetic brake control method of an electric hand tool of claim 1, wherein step 3 causes the short circuit to form simultaneously between the coils and the driving module.

4. The electromagnetic brake control method of an electric hand tool of claim 3, wherein step 3 comprises a sub-step of calculating a short circuit activation time to control the short circuit between the coils and the driving module.

5. The electromagnetic brake control method of an electric hand tool of claim 1, wherein step 3 causes the short circuit to form in turn between the coils and the driving module.

6. The electromagnetic brake control method of an electric hand tool of claim 5, wherein step 3 comprises a sub-step of calculating a short circuit activation time to control the short circuit between the coils and the driving module.

7. An electric hand tool, comprising a driving module, a shutdown element and an electric motor, the electric motor comprising a rotor and a stator, one of the rotor and the stator provided with a plurality of permanent magnets and the other provided with a plurality of coils; the electric hand tool being characterized that:
    the electric hand tool further comprises a brake loop including at least one switch connected between the coils and the driving module, the at least one switch is connected to conduct the brake loop to cause at least one of the coils to form a short circuit when the driving module is triggered and ending an electrically powered state of the electric motor, to cause the electric motor to temporarily enter a power generating state to form a sensing current interacting with the plurality of coils to produce a first magnetic field, and generating an interfering impulsive force by interfering the first magnetic field with a second magnetic field, which is produced by a plurality of permanent magnets provided on the electric motor, to stop the rotor from rotating.

* * * * *